Figure 1:
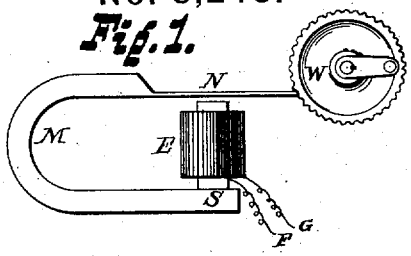

J. J. McTIGHE.

Speaking-Telephone.

No. 8,248. Reissued May 21, 1878.

Witnesses.
R. T. O'Connor
J. C. Hemington

James J. McTighe Inventor
by Connolly Bowman & Co
Attorneys.

UNITED STATES PATENT OFFICE.

JAMES J. McTIGHE, OF ALPSVILLE, PENNSYLVANIA.

IMPROVEMENT IN SPEAKING-TELEPHONES.

Specification forming part of Letters Patent No. 198,406, dated December 18, 1877; Reissue No. 8,248, dated May 21, 1878; application filed January 21, 1878.

*To all whom it may concern:*

Be it known that I, JAMES J. McTIGHE, of Alpsville, in the county of Allegheny and State of Pennsylvania, have invented certain new and useful improvements in the method of producing magneto-electricity and its application to telephones or speaking-telegraphs; and I do hereby declare that the following is a full, clear, and exact description thereof, that will enable others skilled in the art to which it appertains to make and use the same, reference being had to the accompanying drawings, and to the letters of reference marked thereon, which form a part of this specification.

It is well known that the movement of a magnetic pole in the neighborhood of an electro-magnet produces an "Amperian current" in the core of said electro-magnet, which current, in its turn, induces another electrical current in the coil surrounding the core. It is also accepted that the motion of a magnetic pole in the vicinity of an electrical coil, whatsoever be the shape of the coil, produces an electrical current in the coil itself. Reversely, it is also admitted that, howsoever the magnetic force of an electro-magnet or of an electrical coil be varied, corresponding variations in the mutual attractive or repulsive force between itself and a magnetic pole in its vicinity are thereby produced.

From the foregoing it naturally follows that, when the variations of magnetic force in the said electro-magnet or electrical coil succeed each other with sufficient rapidity, the magnetic pole in its vicinity may thereby be made to so vibrate as to produce sound-waves.

Now, as in order to preserve the magnetism of any given magnet it is not necessary to use an armature, but merely to join the two poles of said magnet, so, also, in a somewhat similar manner, and, furthermore, in order to reach the maximum static effects otherwise unattainable in the dependent current of an electro-magnet or electrical coil lying within the influence of a magnet, it is necessary to entirely discard the use of an armature, and the coil or helix being placed between the two poles, or its core constituting the continuation of one of the poles, directly produces the required magnetic variation by vibrating the proper pole of the magnet. Now, when vibration is produced in said proper pole, the same vibration is reproduced in a like pole of a similar combination placed with it in electrical circuit.

Applying these principles, my invention consists, first, in an electric telephone having a permanent or electro magnet, one of whose poles, or a metallic extension therefrom, forms the diaphragm, in combination with an electro-magnet or helix attached to the other pole and facing said diaphragm; second, in the union of two or more such combinations on one electrical circuit for telegraphic or telephonic purposes; third, in the construction, specifically, of a permanent or electro-inducing magnet having an articulating-diaphragm as its pole; fourth, in the combination of a permanent or electro magnet having a pole and an articulating-diaphragm, with an electrical coil or helix, said diaphragm and coil or helix being reciprocally adjustable; fifth, in the construction and combination of parts, all substantially as hereinafter fully described and claimed.

My invention, and the methods by which the same may be made to produce maximum results in the art of telephony, will be better understood from the following.

As the telephone is simply a diminutive magneto-electric apparatus, I will first describe and illustrate the form of magneto-electrical machine which constitutes the basis of my invention.

In Figure 1 of the accompanying drawings, M is a magnet, (permanent steel or electro, it matters not,) whose pole N is made sufficiently thin to vibrate when acted upon by a toothed wheel, W, or by any other means of producing vibrations. E is an electro-magnet, or its substitute, an electrical coil, one end facing said pole N and the other end facing or resting upon and forming the continuation of the pole S. F and G are the ends of the wire of electro-magnet E or coil.

I will here state that, in speaking of an electro-magnet, any form of electrical helix or coil must be considered its equivalent. Now, according to the well-known theory of the formation of electrical currents in an electro-magnet, when a magnet approaches to or recedes from the core of said electro-magnet, the vibrating of the pole N will induce intermittent currents of electricity in the electro-magnet E, which currents may then be used for any purpose for which magneto-electricity is available. It is obvious that these currents may be intensified to any degree within the limits of mechanical means or electrical appliances. The necessary vibrations may be produced, also, by sound-waves, and both poles, N and S, of the magnet M (the electro-magnet being arranged as before stated) may be reduced in thickness for that purpose. It is obvious that, instead of flattening the pole N or S, the magnet M may retain its usual form, and be vibrated by means other than as above described with similar but more powerful results.

Figure 2:
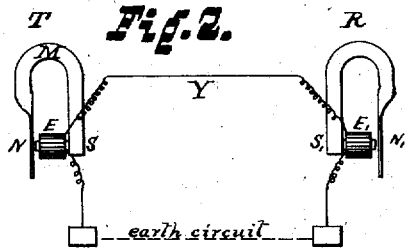
Figure 3:
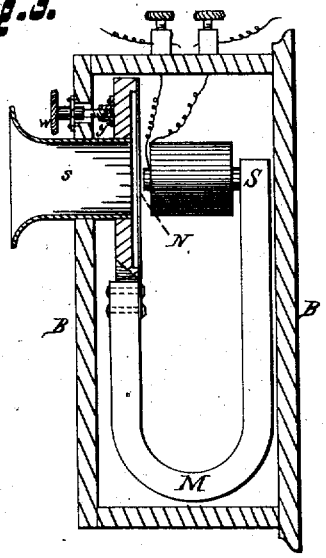

Two of the above-described instruments united in electrical circuit at once form a most perfect telegraphic, telephonic, or teleharmonic apparatus, both for transmitting and receiving intelligible signals and articulate speech or musical sounds, provided one pole or a metallic extension therefrom of the respective magnet of each instrument constitute an articulating-diaphragm, so as to readily vibrate under the influence of either sound-waves or of a varied electrical current and synchronously with the variations of said current, thereby producing sound-waves in the air. Such an apparatus is exhibited in Fig. 2, in which T represents one instrument, and R the other, united on circuit Y, both being alike in construction, and each being capable of acting successively as transmitter and receiver, or simultaneously as both.

As before said, every vibration of pole N of the magnet M in instrument T, by whatever means effected, will produce a current of electricity in the wire of the electro-magnet E, which then traverses circuit Y, and, passing through the electro-magnet E′ of instrument R, causes a change in the mutual attractive force at the time existing between the two poles of the magnet—that is, between the articulating-diaphragm pole N and the electro-magnet E, forming a continuation of the other pole, S—and thereby, being aided by its own resiliency, the diaphragm-pole N is made to vibrate in periods synchronous with the vibrations of pole N; and hence, as experiment proves, if the cause of vibration in pole N be articulate sounds, pole N will correspondingly vibrate, so as to reproduce the same sounds by its action on the air. In this way the apparatus becomes a perfect telephone.

For adjustment, I attach the articulating-diaphragm pole N to the base of tube *s*, and adapt the device *w y* to causing said pole to approach to or recede from electro-magnet E, at pleasure. The whole may be inclosed in a box or casing, B, if desired.

Figure 4:
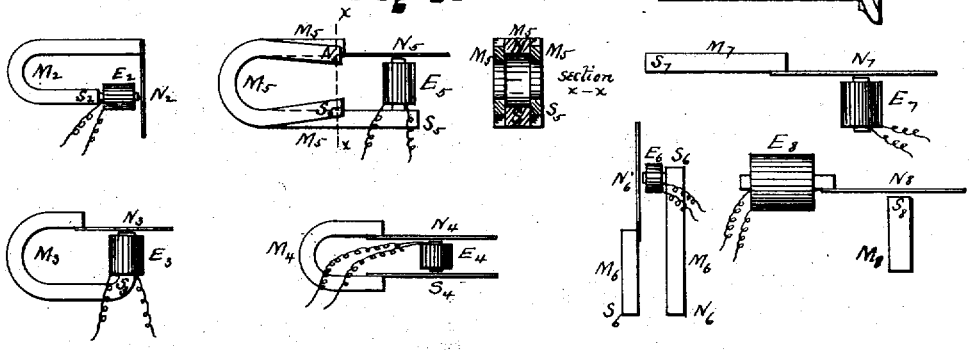

I wish it distinctly understood that I do not in any way limit myself to the specific construction or arrangement above set forth; for, the essential features of my invention being a telephonic magnet having one pole or a metallic extension therefrom forming an articulating-diaphragm and the described relation of such to an electro-magnet or helix, it is obvious that it is but a simple matter of judgment as to the changes of form, size, or arrangement which can be made, all of which would be but mere modifications of the apparatus described. Some of such modifications for telephonic purposes I illustrate in Figs. 4 and 5, which show the most essential feature (the magnet) in various forms and relations.

$M^2$ is an inducing-magnet, having the articulating-pole $N^2$ arranged in front of the pole $S^2$, on which latter is placed or fixed the electro-magnet $E^2$. $M^3$ is an inducing-magnet, having its pole $S^3$ bent around so as to face the articulating-pole $N^3$, and having the coil $E^3$ wound around said pole $S^3$. $M^4$ is an inducing-magnet, having two articulating-poles, $N^4$ and $S^4$, and the electro-magnet $E^4$ situated between them.

Another form is shown in which several magnets, $M^5$, are compounded, having one articulating-pole, $N^5$, and the electro-magnet $E^5$ facing said articulating-pole $N^5$, as shown.

Another form is shown in which two straight magnets, $M^6$, are placed parallel to each other, one having the articulating-pole $N^6$, and the electro-magnet $E^6$ placed between that and the pole $S^6$ of the other.

Another simple arrangement is shown by the magnet $M^7$, having one articulating-pole, $N^7$, facing an electro-magnet, $E^7$.

Another form is shown in which I construct the electro-magnet $E^8$ with an articulating-pole, and opposing such articulating-pole to the pole of a magnet, $M^8$.

Figure 5:
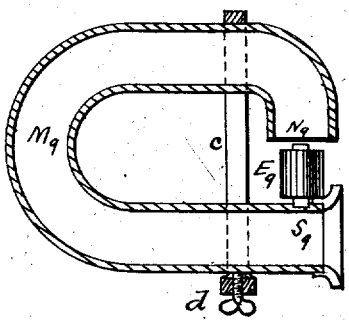
Figure 6:
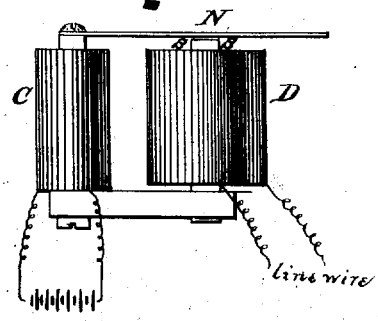

A very special modification of the means of operating my principle is shown in one of its forms by Fig. 5. In this I have a bent tubular magnet, $M^9$, one of whose ends is closed by a thin metallic diaphragm, constituting the articulating-pole $N^9$ of the magnet itself, and the other of whose ends is open, and constitutes the pole $S^9$, the electro-magnet $E^9$ facing the pole $N^9$, as shown. In this way the magnet itself is a speaking and hearing tube, and obviates the necessity of their special construction. Adjustment may be effected by a clamp, *c*, embracing the legs and a set-screw, *d*. This form may also be modified, its main feature being a tubular magnet with one pole or end closed by an articulating-diaphragm, Having stated that the specific construction of the magnet could be applied to either a permanent or electro magnet, I illustrate the latter application by Fig. 6, which shows the electro-magnet C with an articulating-diaphragm for its pole N, and a coil, D, wound upon its pole S, or upon a continuation thereof.

I am aware that many years ago a telephone was invented in which a voltaic current was made and broken by the sound-waves acting on a diaphragm controlling a circuit-breaker, the sounds being reproduced by an electro-magnetic receiver. It is also conceded that a telephone has been invented and patented which is based on the well-known principle of one form of magneto-electric machine, that the vibrations of an armature produce currents of electricity in a coil surrounding either one pole of a magnet or a magnetic core attached thereto, such telephone comprising and consisting, essentially, of a speaking-diaphragm, a magnet, and an electrical coil. I therefore do not claim either of said constructions, as my invention is based upon another form of magneto-electrical machine, in which the currents of electricity are produced by the vibration of one pole of a magnet or magnetic system in the field of the other pole, having a helix wound upon it or upon a magnetic core attached to such other pole.

The broad idea of my invention is, therefore, a permanent or electro magnet for telephonic or speaking telegraphic purposes, having its pole or poles reduced to a diaphragm form; and I do not wish to be understood as claiming anything previously known or inconsistent with this idea.

More specifically, I particularly disclaim the combination, broadly, in an acoustic telegraph, of an electro-magnet and a polarized armature formed of a plate of iron, steel, or other material capable of inductive action, and a resonant tube or case.

I claim as my invention—

1. The combination, in an electrical circuit, of two or more telephonic or speaking-telegraph instruments, consisting each of a permanent or electro-inducing magnet and an electrical coil or helix in its natural condition, and in inductive proximity thereto, one of said poles constituting the metallic diaphragm of the instrument, substantially as described.

2. A permanent or electro magnet having its pole or poles reduced to a diaphragm form, substantially as described.

3. As an article of manufacture, a compound or composite magnet, consisting of a metallic diaphragm and a permanent or electro magnet, arranged substantially as described, so that the diaphragm is a continuation of the pole of the magnet itself, substantially as described.

4. The combination of an electrical coil or helix with a permanent or electro magnet, having one or both poles, or their continuation, of diaphragm form, said electrical coil or helix and pole or poles being adjustable with relation to each other, substantially as described.

5. A permanent or electro magnet having its pole or poles, or continuation thereof, of diaphragm form, in combination with an electrical coil or helix, substantially as described.

6. In an electric telephone, the combination of a tubular magnet with a metallic diaphragm, substantially as set forth.

7. In an electric telephone, the combination of a tubular magnet, a metallic diaphragm, and an electro-magnet or helix, substantially as described.

8. In an electric telephone, a tubular magnet for use as a speaking or hearing tube, for the purpose of conveying sounds to or from the diaphragm, substantially as described.

In testimony that I claim the foregoing I have hereunto set my hand this 18th day of January, 1878.

JAMES J. McTIGHE.

Witnesses:
A. V. D. WATTERSON,
J. T. MYLER.